United States Patent
Yasunaga et al.

(10) Patent No.: US 7,599,567 B2
(45) Date of Patent: *Oct. 6, 2009

(54) IMAGE ENCODING APPARATUS AND IMAGE ENCODING METHOD

(75) Inventors: Masaaki Yasunaga, Tagata-gun (JP); Sunao Tabata, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 11/965,995

(22) Filed: Dec. 28, 2007

(65) Prior Publication Data

US 2008/0107347 A1   May 8, 2008

Related U.S. Application Data

(63) Continuation of application No. 11/020,029, filed on Dec. 23, 2004, now Pat. No. 7,333,667.

(51) Int. Cl.
G06K 9/36 (2006.01)
G06K 9/46 (2006.01)

(52) U.S. Cl. ................ 382/243; 382/238; 382/240; 382/284

(58) Field of Classification Search .......... 382/162, 382/164, 173, 181, 193, 195, 217, 232, 233, 382/238, 240, 243, 246, 249, 253, 254, 276, 382/277; 348/571; 707/3, 5, 6; 713/181, 713/193; 716/5

See application file for complete search history.

(56) References Cited

U.S. PATENT DOCUMENTS

| | | | |
|---|---|---|---|
| 5,394,191 A | 2/1995 | Sirat et al. | |
| 5,680,475 A | 10/1997 | Zwierski et al. | |
| 6,154,737 A * | 11/2000 | Inaba et al. | 707/3 |
| 6,263,477 B1 * | 7/2001 | Kobayashi | 716/5 |
| 6,463,176 B1 | 10/2002 | Matsugu et al. | |
| 6,792,538 B1 * | 9/2004 | Kuroda et al. | 713/193 |
| 2002/0009236 A1 * | 1/2002 | Sakamoto | 382/246 |
| 2004/0131261 A1 | 7/2004 | Lee et al. | |
| 2006/0140488 A1 | 6/2006 | Yasunaga et al. | |
| 2006/0188167 A1 * | 8/2006 | Watanabe et al. | 382/240 |
| 2008/0107347 A1 * | 5/2008 | Yasunaga et al. | 382/238 |

FOREIGN PATENT DOCUMENTS

| | | |
|---|---|---|
| JP | 5-127866 A | 5/1993 |
| JP | 5-150939 A | 6/1993 |
| JP | 7-282040 A | 10/1995 |

* cited by examiner

Primary Examiner—Amir Alavi
(74) Attorney, Agent, or Firm—Foley & Lardner LLP

(57) ABSTRACT

In an image encoding apparatus, pattern image cut-out means cuts out partial regions of an image of image data and generates pattern images. At the same time, the pattern image cut-out means outputs position information that is representative of positions on the image data, from which the pattern images are cut out. Rearrangement means receives the generated pattern images, rearranges the pattern images, and outputs the rearranged pattern images. Dictionary generating means generates list information in which the rearranged pattern images are put together in the form of, e.g. a list. Pattern image synthesis means generates a single image ("pattern image synthesis image") in which the pattern images are combined in order. Encoded data generating means generates and outputs final encoded data, on the basis of the generated pattern image synthesis image and the generated pattern image position information.

20 Claims, 8 Drawing Sheets

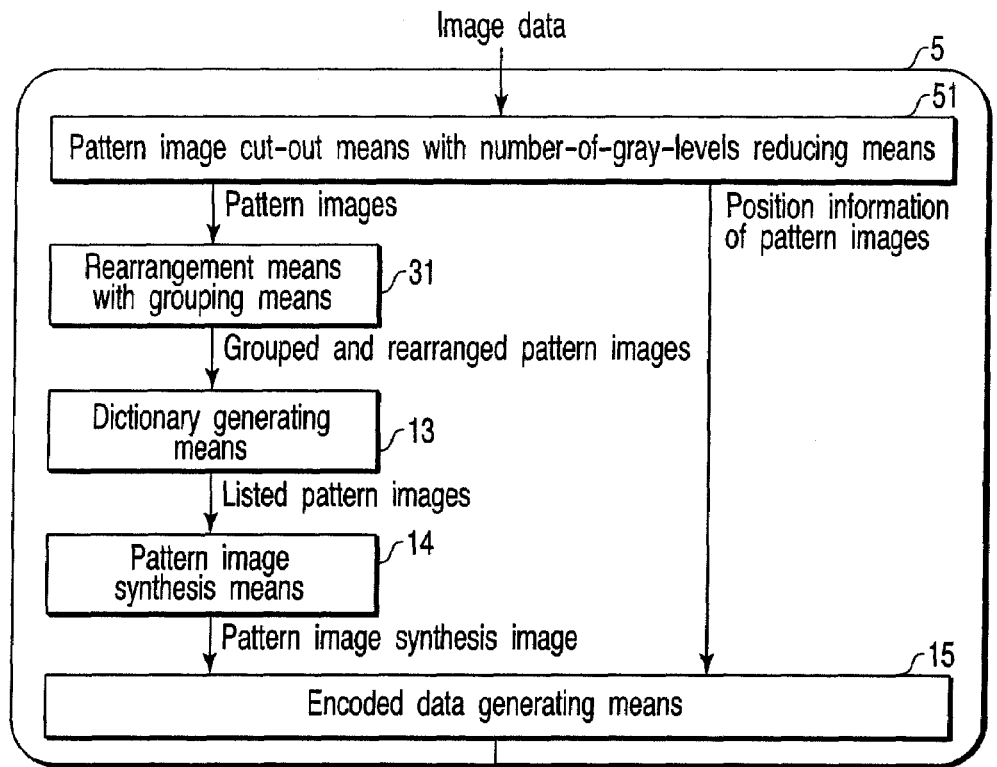
F I G. 10
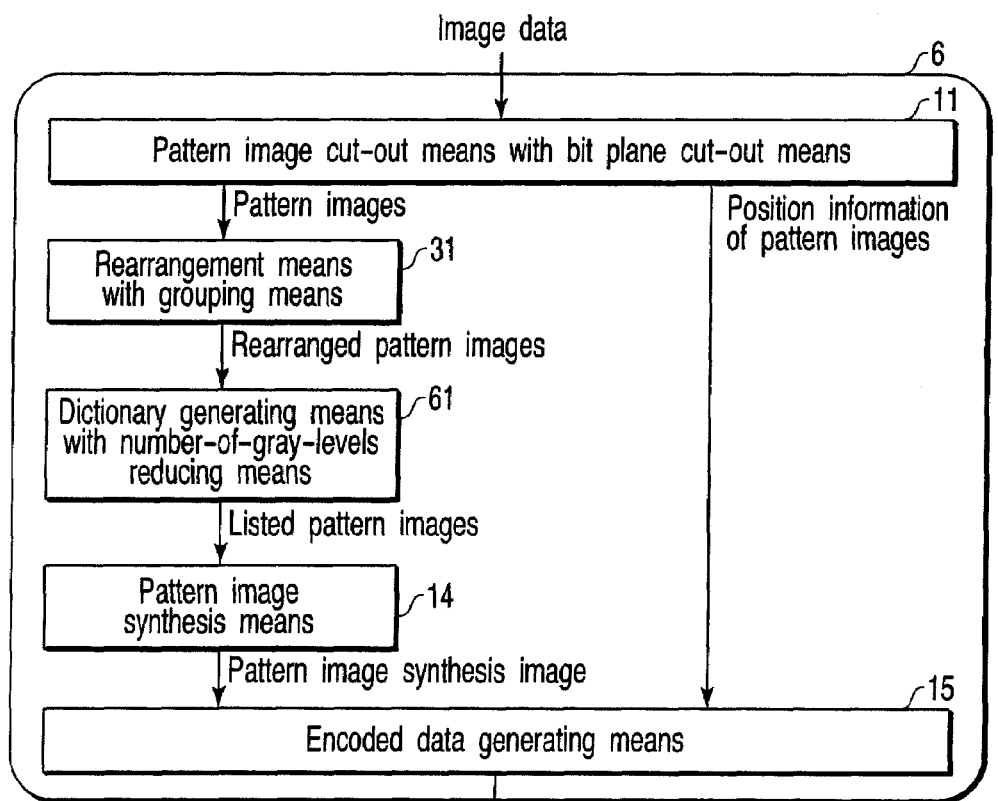
F I G. 11

IMAGE ENCODING APPARATUS AND IMAGE ENCODING METHOD

CROSS-REFERENCE TO RELATED APPLICATIONS

The present application is continuation of U.S. application Ser. No. 11/020,029, filed Dec. 23, 2004 now U.S. Pat. No. 7,333,667, the entire contents of which are incorporated herein by reference.

BACKGROUND OF THE INVENTION

1. Field of the Invention

The present invention relates to an image encoding apparatus and an image encoding method, which encode image data into encoded data.

2. Description of the Related Art

In a prior-art image encoding apparatus, a plurality of partial regions (hereinafter referred to as "pattern images") are cut out of an input image. Position information of the cut-out pattern images is extracted, and the pattern images are individually encoded. Alternatively, the plural pattern images are simply gathered and treated as a single image, and the single image is encoded. Using synthesis image data of the pattern images and the position information of the pattern images, encoded data is generated.

In "Pattern Dictionary" or "Symbol Dictionary", as disclosed in ISO/IEC 14492, pattern images that are cut out of an input image are subjected to a similar process that is named "Symbol instance bitmap".

The prior-art encoding method, however, has the following drawback.

In the prior-art encoding method, pattern images are gathered and encoded. In this method, the pattern images are simply cut out, the pattern images are simply gathered and treated as a single image, and the single image is encoded. No consideration is given to the shapes of the pattern images, and the efficiency in encoding is low.

BRIEF SUMMARY OF THE INVENTION

The object of an aspect of the present invention is to provide an image encoding apparatus and an image encoding method, which can stably achieve high compression efficiency by finding an arrangement pattern with good encoding efficiency.

According to an aspect of the present invention, there is provided an image encoding apparatus that encodes image data, comprising: pattern image cut-out means for cutting out a plurality of pattern images from the image data, and outputting the plurality of cut-out pattern images and position information associated with the cut-out pattern images; rearrangement means for rearranging the plurality of pattern images that are cut out by the pattern image cut-out means; dictionary generating means for listing the plurality of pattern images that are rearranged by the rearrangement means; pattern image synthesis means for synthesizing the plurality of pattern images that are listed by the dictionary generating means; and encoded data generating means for generating encoded data, using a synthesis image of the pattern images, which is synthesized by the pattern image synthesis means, and the position information of the plurality of pattern images, which is output from the pattern image cut-out means.

According to another aspect of the present invention, there is provided an image encoding method that encodes image data, comprising: cutting out a plurality of pattern images from the image data, and outputting the plurality of cut-out pattern images and position information associated with the cut-out pattern images; rearranging the plurality of pattern images that are cut out; listing the plurality of pattern images that are rearranged; synthesizing the plurality of pattern images that are listed; and generating encoded data, using a synthesis image of the pattern images, which is synthesized, and the position information of the plurality of pattern images, which is output.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

FIG. 10 is a block diagram that schematically shows the structure of an image encoding apparatus according to a fifth embodiment of the present invention;

FIG. 11 is a block diagram that schematically shows the structure of an image encoding apparatus according to a sixth embodiment of the present invention;

DETAILED DESCRIPTION OF THE INVENTION

Embodiments of the present invention will now be described with reference to the accompanying drawings.

Figure 1:
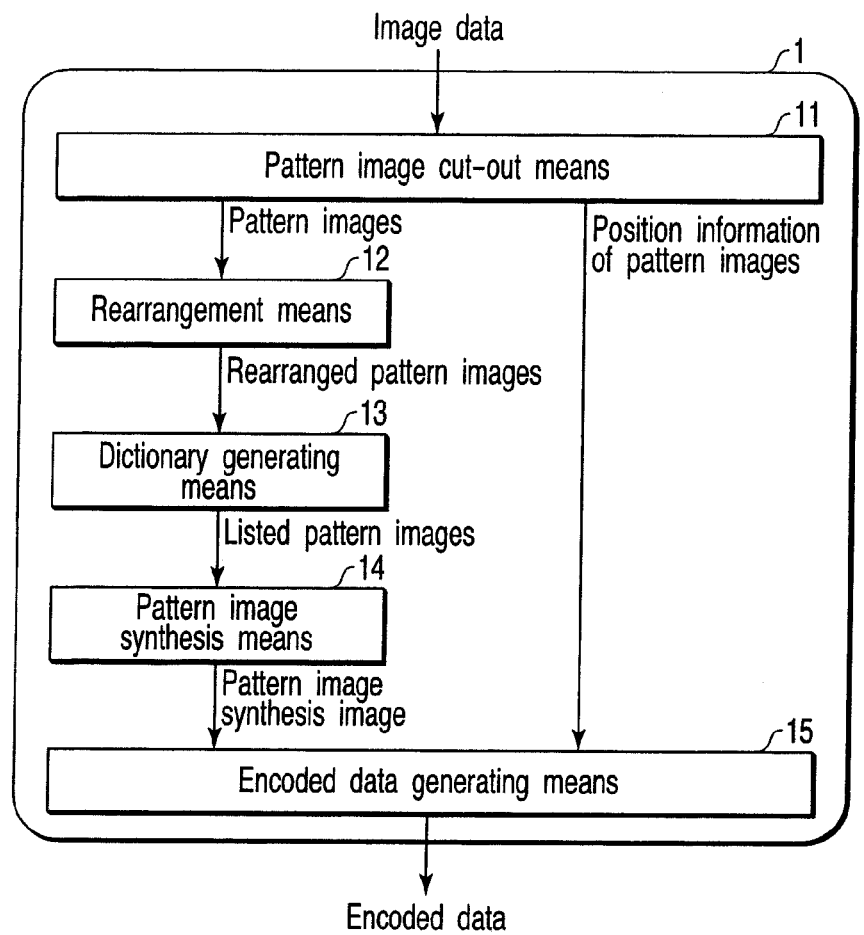
FIG. 1 is a block diagram that schematically shows the structure of an image encoding apparatus according to a first embodiment of the present invention.

FIG. 1 schematically shows the structure of an image encoding apparatus 1 according to a first embodiment of the present invention. The image encoding apparatus 1 of the first embodiment comprises pattern image cut-out means 11, rearrangement means 12, dictionary generating means 13, pattern image synthesis means 14 and encoded data generating means 15.

The pattern image cut-out means 11 receives image data and outputs pattern images and associated position information on the basis of the image data.

The rearrangement means 12 receives the pattern images from the pattern image cut-out means 11, rearranges the pattern images and outputs rearranged pattern images.

The dictionary generating means 13 receives the rearranged pattern images from the rearrangement means 12, and lists the pattern images.

The pattern image synthesis means 14 receives the listed pattern images from the dictionary generating means 13, and sequentially arranges the pattern images, thereby forming a single image.

The encoded data generating means 15 receives and encodes the pattern image synthesis image, which is generated by the pattern image synthesis means 14, and the position information, and outputs encoded data.

Next, the specific structures of the respective means are described.

The pattern image cut-out means 11 receives image data and cuts out partial regions (pattern images) of the input image by means of image region discrimination, layout analysis or manual processing. At least one pattern image is cut out. Each pattern image is assigned an identification number, and the pattern image and its position are associated by the identification number. At the same time as cutting out the pattern image, the position information of the pattern image is extracted.

Figure 2:
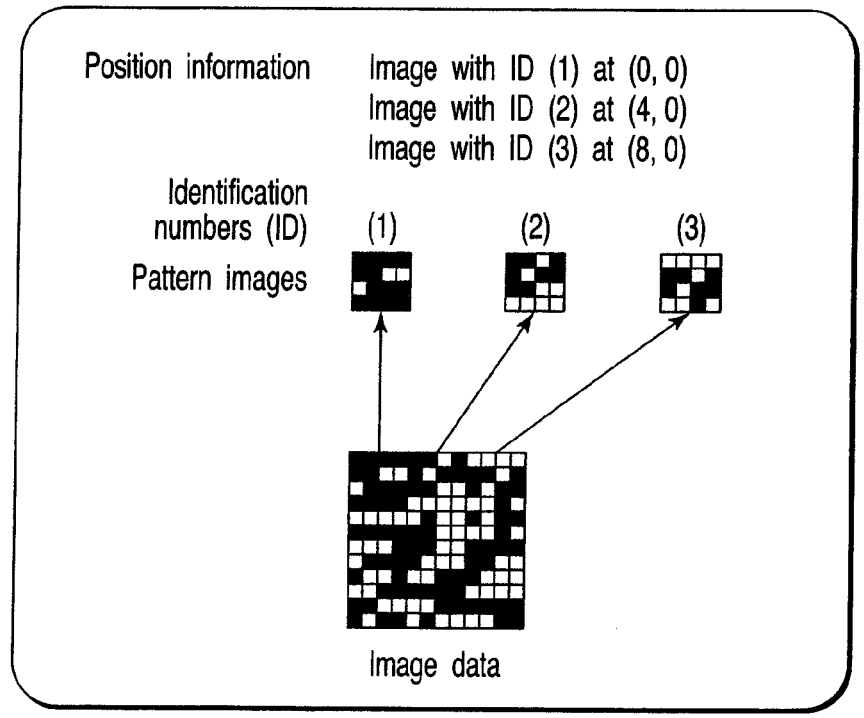
FIG. 2 shows examples of pattern images and identification numbers.

FIG. 2 shows examples of the pattern images and identification numbers.

Position information (0, 0) is associated with an image with ID(1), position information (4, 0) is associated with an image with ID(2), and position information (8, 0) is associated with an image with ID(3).

The identification numbers (IDs), as shown in FIG. 2, are assigned such that ID(1), ID(2) and ID(3) are assigned to the respective pattern images that are cut out of the image data.

Specifically, FIG. 2 shows an example in which the identification numbers (IDs) are assigned to the pattern images, thereby determining the position information.

The output of the pattern image cut-out means 11 is the plural pattern images and the associated position information.

The rearrangement means 12 receives the plural cut-out pattern images from the pattern image cut-out means 11, and changes the order of arrangement of the pattern images by the following rearrangement means.

Examples of Rearrangement Means (1) The code amounts of all arrangement patterns are estimated, and an arrangement pattern, which can realize the highest encoding ratio, is adopted.

(2) All arrangement patterns are generated, and an arrangement pattern with a least number of run-lengths is adopted.

(3) All arrangement patterns are generated, and an arrangement pattern with a least number of white/black change points (i.e. points at which white changes to black, or black changes to white) is adopted.

(4) Each character bitmap is subjected to Y-axis projection, and pattern images are arranged from one with a large projection pattern or a small projection pattern.

(5) All arrangement patterns are generated, and an arrangement pattern, which has a least number of white/black change points at an uppermost row (or several uppermost rows) of each pattern image, is adopted.

(6) All arrangement patterns are generated, and an arrangement pattern, which has a least number of run-length patterns (kinds) at an uppermost row (or several uppermost rows) of each pattern image, is adopted.

One of, or a combination of, the rearrangement means, is used to determine the arrangement pattern.

The output of the rearrangement means 12 is a plurality of rearranged pattern images.

The dictionary generating means 13 receives the rearranged pattern images from the rearrangement means 12 and lists the pattern images. The output of the dictionary generating means 13 is the listed pattern images.

The pattern image synthesis means 14 receives the listed pattern images that are listed by the dictionary generating means 13, arranges the pattern images in the order of input, and forms a single image. The output of the pattern image synthesis means 14 is a pattern image synthesis image.

The encoded data generating means 15 receives the pattern image synthesis image that is generated by the pattern image synthesis means 14 and the position information of the pattern images from the pattern image cut-out means 11, and encodes the pattern image synthesis image using MMR, arithmetic encoding, or a conventional compression scheme such as JPEG. At the same time, the position information of the pattern image is added.

The output of the encoded data generating means 15 is the encoded data in which the image data is encoded.

Figure 3:
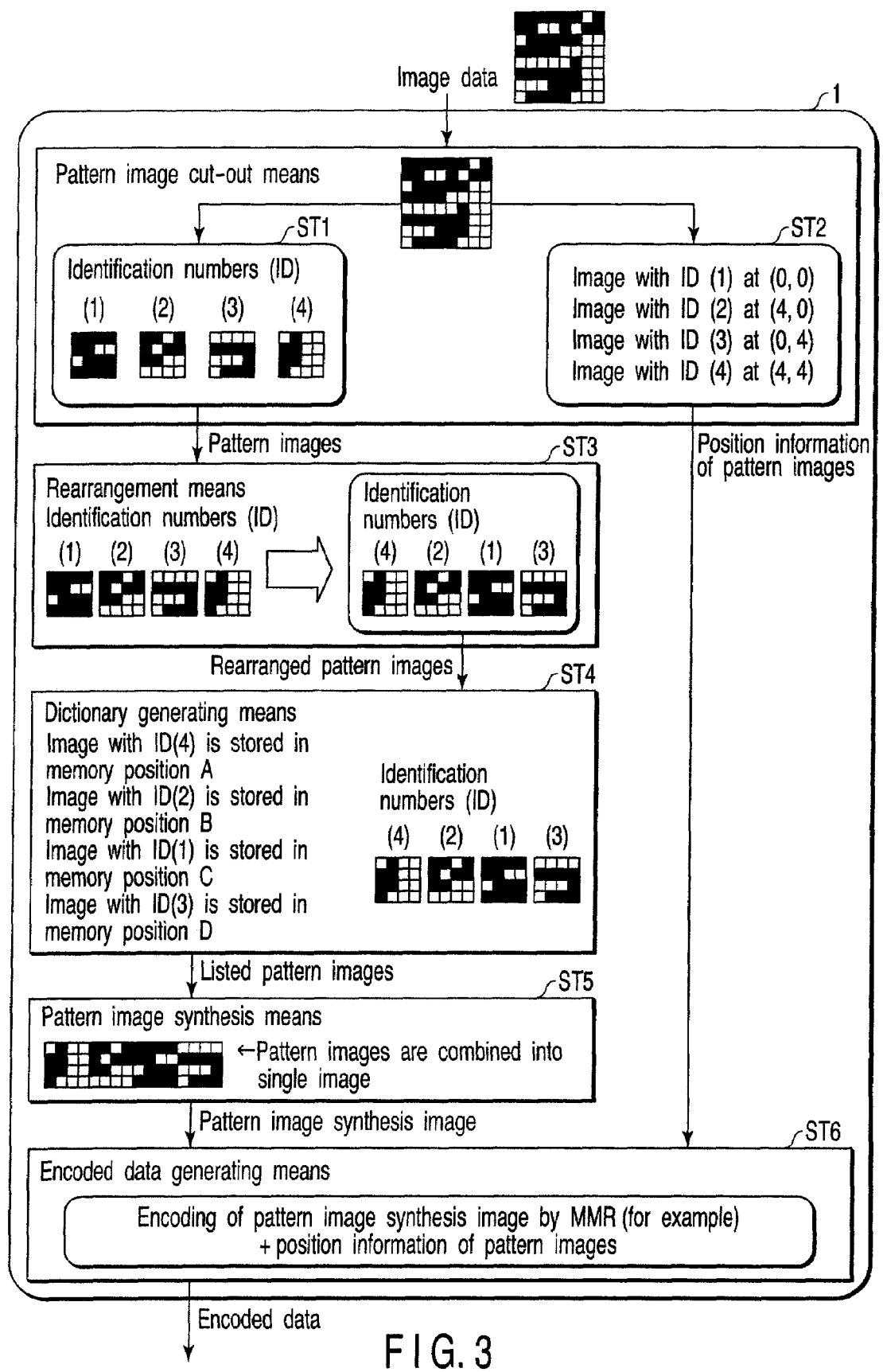
FIG. 3 is a flow chart that illustrates a process in the image encoding apparatus according to the first embodiment.

Next, the process in the image encoding apparatus 1 of the first embodiment is described referring to a flow chart of FIG. 3. The input in the present process is image data such as bitmap data.

To start with, image data that is input to the image encoding apparatus 1 is delivered to the pattern image cut-out means 11.

The pattern image cut-out means 11 cuts out partial regions of the image of the image data and generates pattern images (ST1). Assume that one or more pattern images of an arbitrary size are generated from the input image data. In FIG. 3, identification numbers ID(1), ID(2), ID(3) and ID(4) are assigned to the generated pattern images from the leftmost one.

At the same time as generating the pattern images, the pattern image cut-out means 11 outputs position information that is representative of positions on the image data, from which the pattern images are cut out (ST2). In FIG. 3, position information (0, 0) is associated with an image with ID(1), position information (4, 0) is associated with an image with ID(2), position information (0, 4) is associated with an image with ID(3), and position information (4, 4) is associated with an image with ID(4).

The correspondency between the pattern images and their positions is determined, for example, by a method in which identification numbers are assigned to the pattern images and the pattern images are associated with the positions by the identification numbers, or a method in which the positions of pattern images are stored in the order of cutting out the pattern images.

If there are identical pattern images that are generated, these pattern images may be represented by a single pattern image and only position information relating to the identical pattern images may be output. Thereby, the number of necessary pattern images can be reduced. Hence, the number of images to be encoded can be reduced.

Subsequently, the rearrangement means 12 receives the pattern images that are generated by the pattern image cut-out means 11, rearranges the pattern images, and outputs the rearranged pattern images (ST3). That is, the pattern images that are assigned identification numbers ID(1), ID(2), ID(3) and ID(4) from the leftmost one are rearranged in the order of pattern images with ID(4), ID(2), ID(1) and ID(3) from the left.

This rearrangement exhibits an advantageous effect in a subsequent process in the pattern image synthesis means 14. The advantageous effect will be described later in connection with the pattern image synthesis means 14.

The dictionary generating means 13 generates list information in which the pattern images, which are rearranged by the rearrangement means 12, are put together in the form of, e.g. a list (ST4). In this case, the pattern images may be grouped, or the pattern image may be present as a single pattern image. Normally, the single pattern image is regarded as one group.

The pattern image synthesis means 14 receives the pattern images (group) that are listed by the dictionary generating means 13, and generates a single image (hereinafter referred to as "pattern image synthesis image") in which pattern images are combined in order in units of a group (ST5). By making a plurality of images into a single image, the encoding efficiency of the image can be enhanced.

The encoding amount of the pattern image synthesis image varies depending on the order of arrangement of pattern images. The rearrangement means 12 is thus required to rearrange the pattern images in an arrangement pattern that can enhance the efficiency of encoding.

Assume that the order of generated pattern image synthesis images corresponds to the order of encoded groups.

Subsequently, the encoded data generating means 15 generates and outputs final encoded data, on the basis of the pattern image synthesis image that is generated by the pattern image synthesis means 14, and the pattern image position information that is generated by the pattern image cut-out means 11 (ST6). In this case, the encoding is executed using, e.g. MMR.

As has been described above, according to the first embodiment, the amount of generated encoded data can be reduced, compared to the case of simply encoding pattern images by the encoded data generating means.

Next, a second embodiment of the invention is described.

Figure 4:
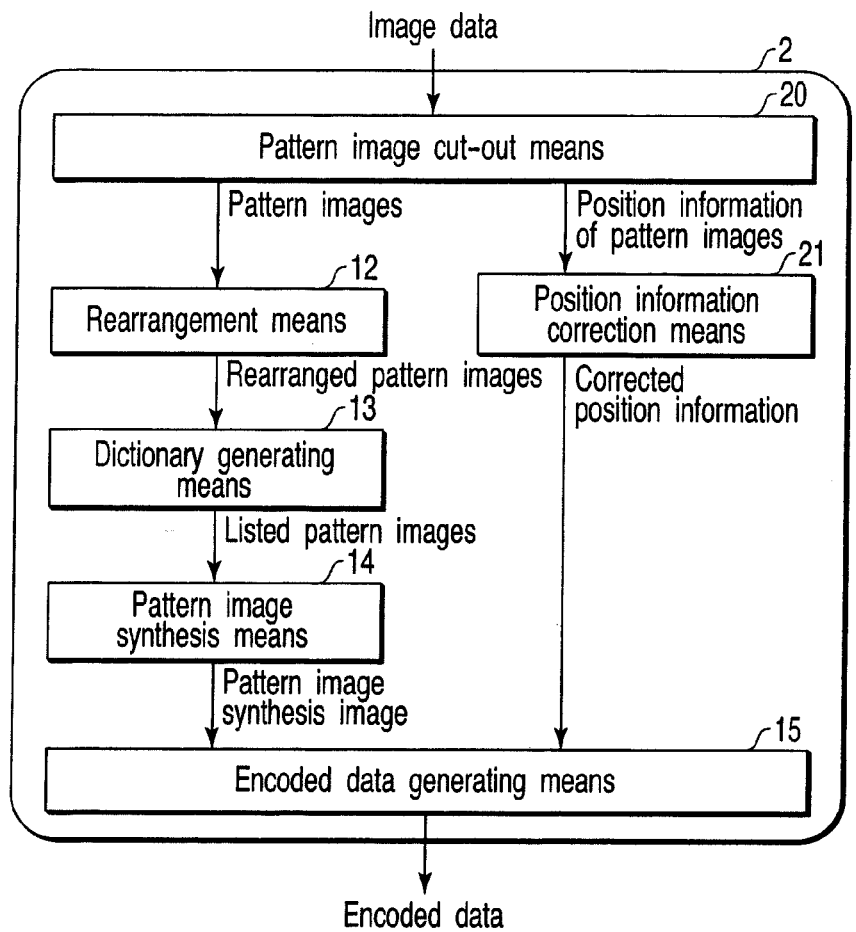
FIG. 4 is a block diagram that schematically shows the structure of an image encoding apparatus according to a second embodiment of the present invention.

FIG. 4 schematically shows the structure of an image encoding apparatus 2 according to the second embodiment.

In the second embodiment, position information correction means 21 is added to the structure of the image encoding apparatus 1 of the first embodiment. The parts, other than the pattern image cut-out means 20 and position information correction means 21, are the same as those in the first embodiment. Thus, the common parts are denoted by like reference numerals and a description is omitted.

The pattern image cut-out means 20 receives image data and cuts out partial regions (pattern images) of the input image by means of image region discrimination, layout analysis or manual processing. At least one pattern image is cut out.

At the same time as cutting out the pattern image, the pattern image cut-out means 20 extracts position information of the pattern image. The pattern images and the position information are output such that the order of arrangement of the pattern images is associated with the order of position information of the pattern images. Thus, the pattern image is associated with its position. The pattern images and their positions are associated, for example, as shown in FIG. 5.

Figure 5:
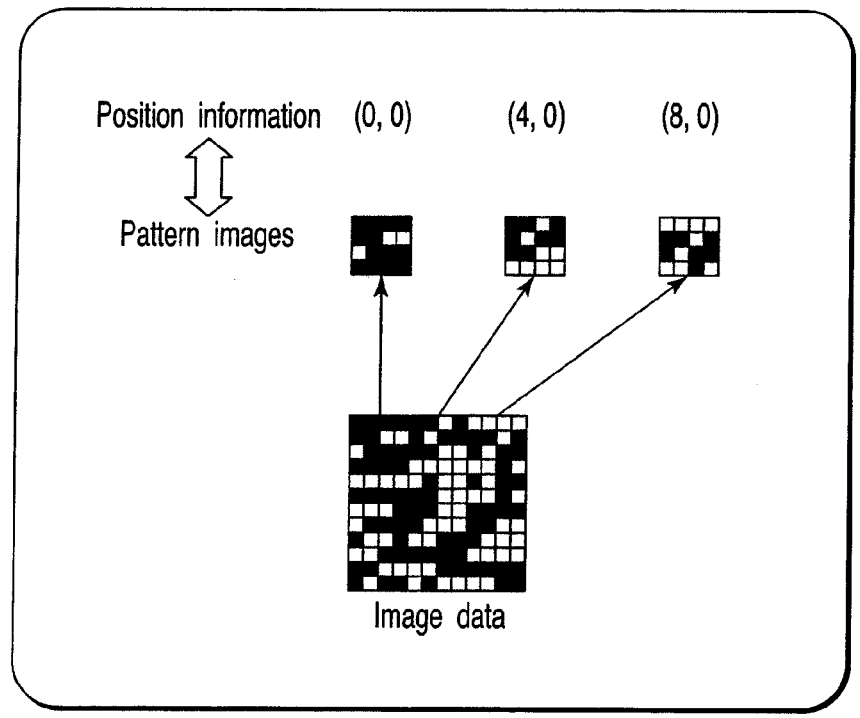
FIG. 5 is a view for explaining pattern images and their positions.

As is shown in FIG. 5, the output of the pattern image cut-out means 20 is a plurality of pattern images and the associated position information.

The position information correction means 21 receives the pattern image position information from the pattern image cut-out means 20, and difference information between the orders of arrangement before and after the rearrangement, which is output from the rearrangement means 12. The position information correction means 21 corrects the position information such that the pattern images and their positional relation become unchanged before and after the rearrangement.

The output of the position information correction means 21 is the corrected position information.

Figure 6:
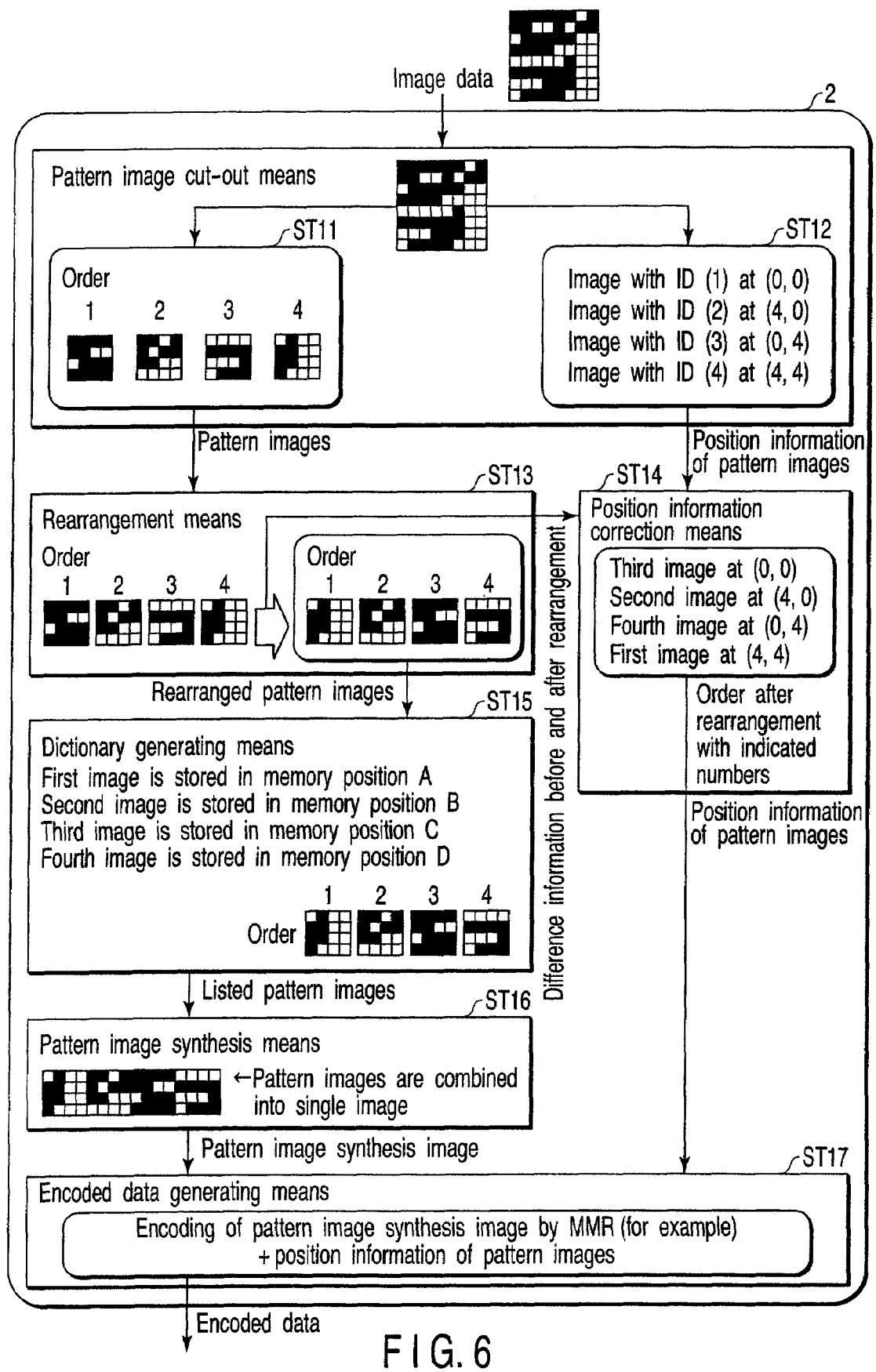
FIG. 6 is a flow chart that illustrates a process in the image encoding apparatus according to the second embodiment.

Next, the process in the image encoding apparatus 2 of the second embodiment is described referring to a flow chart of FIG. 6.

To start with, the pattern image cut-out means 11 cuts out partial regions of the image of the input image data and generates pattern images (ST11). The order of cut-out pattern images is determined such that the leftmost image is a first image, following which a second image, a third image and a fourth image are arranged. These pattern images are input to the rearrangement means 12.

At the same time as generating the pattern images, the pattern image cut-out means 11 outputs to the position information correction means 21 position information that is representative of positions on the image data, from which the pattern images are cut out (ST12). In FIG. 6, position information (0, 0) is associated with the first image, position information (4, 0) is associated with the second image, position information (0, 4) is associated with the third image, and position information (4, 4) is associated with the fourth image.

The rearrangement means 12 receives the pattern images that are generated by the pattern image cut-out means 20 and rearranges the pattern images (ST13). The numbers 1, 2, 3 and 4 of the order of pattern images from the leftmost one are changed such that the pattern image with number 4 is rearranged as the pattern image with number 1, the pattern image with number 2 is rearranged as the pattern image with number 2, the pattern image with number 1 is rearranged as the pattern image with number 3, and the pattern image with number 3 is rearranged as the pattern image with number 4. The difference information before and after the rearrangement is output to the position information correction means 21.

The position information correction means 21 receives the pattern image position information from the pattern image cut-out means 20, and difference information between the order of arrangement before rearrangement and the order of arrangement after rearrangement, which is output from the rearrangement means 12. The position information correction means 21 supplies the encoded data generating means 15 with corrected position information in which the pattern images output from the rearrangement means 12 are properly associated with the position information output from the pattern image cut-out means 20 (ST14).

On the other hand, the rearrangement means 12 outputs the rearranged pattern images to the dictionary generating means 13.

The dictionary generating means 13 generates list information in which the pattern images, which are rearranged by the rearrangement means 12, are put together in the form of, e.g. a list (ST15). The listed pattern images are output to the pattern image synthesis means 14.

The pattern image synthesis means 14 generates a single image ("pattern image synthesis image") by combining the pattern images (ST16). The pattern image synthesis image is output to the encoded data generating means 15.

The encoded data generating means 15 generates and outputs final encoded data, on the basis of the pattern image synthesis image that is generated by the pattern image synthesis means 14, and the pattern image position information that is generated by the position information correction means 21 (ST17).

As has been described above, according to the second embodiment, even in the case of the position information in which the pattern images and their positions are managed based on the order of arrangement, the rearrangement means can be applied to the pattern images.

Next, a third embodiment of the invention is described.

Figure 7:
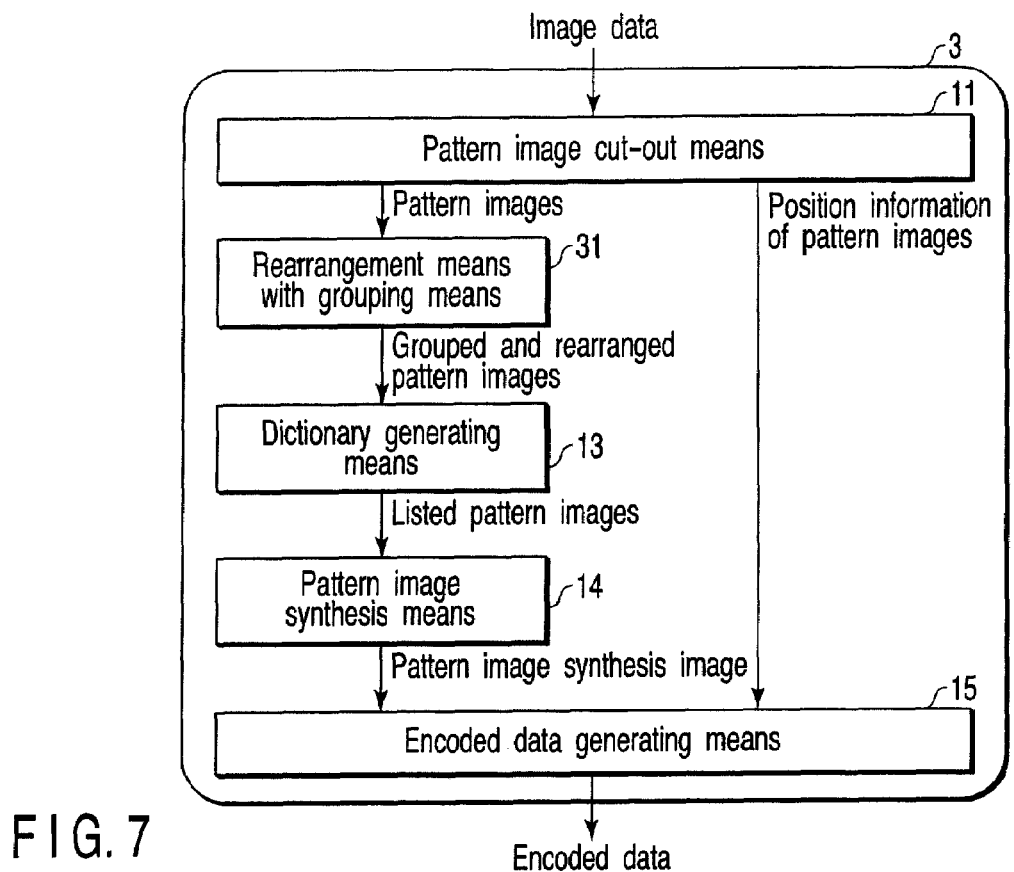
FIG. 7 is a block diagram that schematically shows the structure of an image encoding apparatus according to a third embodiment of the present invention.

FIG. 7 schematically shows the structure of an image encoding apparatus 3 according to the third embodiment. The image encoding apparatus 3 of the third embodiment includes rearrangement means 31 with grouping means, which is obtained by modifying the rearrangement means 12 of the image encoding apparatus 1 shown in FIG. 1. The other structural parts are common to those of the image encoding apparatus 1, so the common parts are denoted by like reference numerals and a description is omitted.

The grouping means in the rearrangement means 31 with grouping means functions to gather and group arbitrary pattern images. Examples of the grouping are as follows.

(1) Pattern images with similar shapes are grouped (e.g. determination based on difference information, etc.).

(2) Pattern images with the same height are grouped.

(3) Pattern images with the same number of gray levels are grouped.

Groups, which are formed by the grouping, are assigned sequential identification number from number 1.

The rearrangement means 31 with grouping means executes the grouping means immediately before or after rearrangement of pattern images. The operation for the rearrangement of pattern images is the same as that in the first embodiment, so a description is omitted here.

The rearrangement means 31 with grouping means receives the pattern images from the pattern image cut-out means 11, and outputs the grouped and rearranged pattern images to the dictionary generating means 13.

As has been described above, according to the third embodiment, the management of pattern images is easy and the pattern image synthesis means can efficiently be applied.

Next, a fourth embodiment of the invention is described.

Figure 8:
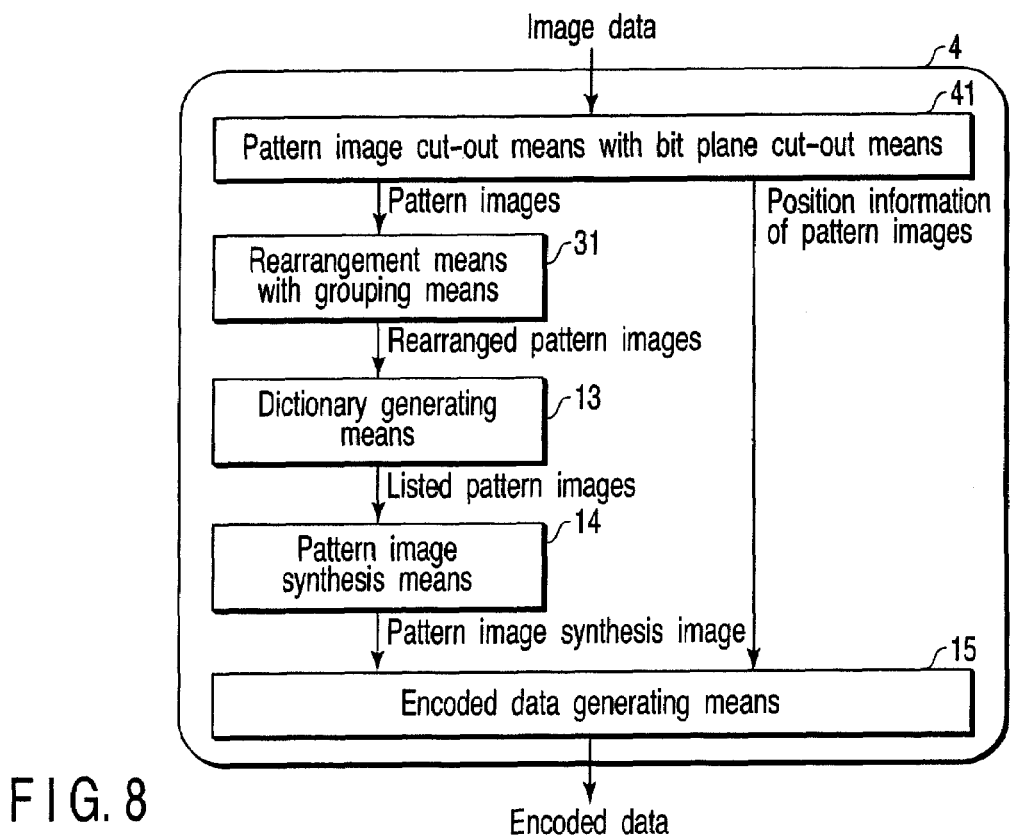
FIG. 8 is a block diagram that schematically shows the structure of an image encoding apparatus according to a fourth embodiment of the present invention.

FIG. 8 schematically shows the structure of an image encoding apparatus 4 according to the fourth embodiment. The image encoding apparatus 4 of the fourth embodiment includes pattern image cut-out means 41 with bit plane cut-out means, which is obtained by modifying the pattern image cut-out means 11 of the image encoding apparatus 3 shown in FIG. 7. The other structural parts are common to those of the image encoding apparatus 3, so the common parts are denoted by like reference numerals and a description is omitted.

For example, when an input image is a 32-bit image, the pattern image cut-out means 41 with bit plane cut-out means regards the input image as comprising 32 1-bit images, thus cutting out pattern images of the input image. The operation for cutting out the pattern images is the same as that described above, so a description is omitted here.

Figure 9:
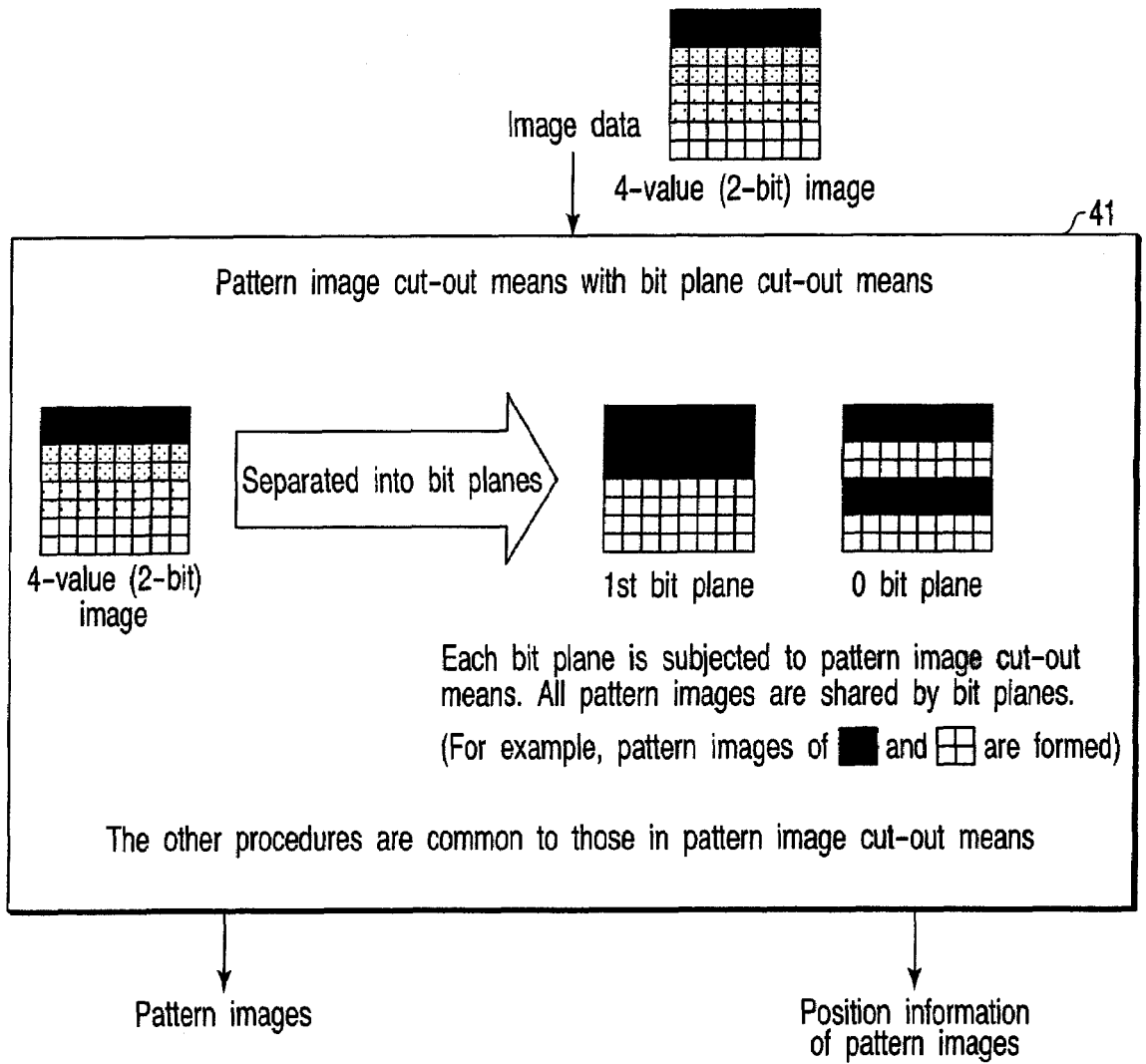
FIG. 9 is a view for explaining a process operation of pattern image cut-out means with bit-plane cut-out means.

FIG. 9 illustrates a process operation of the pattern image cut-out means 41 with bit plane cut-out means.

To start with, the pattern image cut-out means 41 with bit plane cut-out means separates the input image data into bit planes. In FIG. 9, a 4-value (2-bit) image is separated into bit planes, that is, a 1st-bit image and a 0th-bit image.

The pattern image cut-out means 41 with bit plane cut-out means cuts out pattern images of each image, and generates the pattern images and their position information.

As has been described above, according to the fourth embodiment, the number of overlapping pattern images increases, and the number of patterns to be encoded decreases. As a result, the encoding efficiency can be improved.

Next, a fifth embodiment of the invention is described.

FIG. 10 schematically shows the structure of an image encoding apparatus 5 according to the fifth embodiment. The image encoding apparatus 5 of the fifth embodiment includes pattern image cut-out means 51 with number-of-gray-levels reducing means, which is obtained by modifying the pattern image cut-out means 11 of the image encoding apparatus 3 shown in FIG. 7. The other structural parts are common to those of the image encoding apparatus 3, so the common parts are denoted by like reference numerals and a description is omitted.

The number-of-gray-levels reducing means in the pattern image cut-out means 51 with number-of-gray-levels reducing means is means for reducing the number of gray levels of pattern images that are to be cut out (or that have been cut out). Assume now that a pattern image of, e.g. a black character, which can be represented by white/black binary values, has been cut out, despite an input being a 32-bit image. In this case, the pattern image is normally represented by 32 bits. However, with use of the number-of-gray-levels reducing means, the pattern image is replaced with binary (1-bit) data.

With the application of the number-of-gray-levels reducing means, the amount of data to be encoded can be reduced in advance. In this case, it is imperative that the number of gray levels of the original image be included in encoded data that is finally generated.

The pattern image cut-out means 51 with number-of-gray-levels reducing means reduces the number of gray levels of an object image (input image data or each pattern image) before (or after) cutting out pattern images in the image of the input image data. Then, the pattern image cut-out means 51 with number-of-gray-levels reducing means generates pattern images or their position information.

As has been described above, according to the fifth embodiment, the number of gray levels of the pattern image can be reduced in advance. Therefore, the amount of data to be encoded can be reduced in advance.

Next, a sixth embodiment of the invention is described.

FIG. 11 schematically shows the structure of an image encoding apparatus 6 according to the sixth embodiment. The image encoding apparatus 6 of the sixth embodiment includes dictionary generating means 61 with number-of-gray-levels reducing means, which is obtained by modifying the dictionary generating means 13 of the image encoding apparatus 3 shown in FIG. 7. The other structural parts are common to those of the image encoding apparatus 3, so the common parts are denoted by like reference numerals and a description is omitted.

The dictionary generating means 61 with number-of-gray-levels reducing means receives pattern images that have been rearranged by the rearrangement means 31 with grouping means.

The dictionary generating means 61 with number-of-gray-levels reducing means reduces the number of gray levels of the input pattern images by the number-of-gray-levels reducing means, and outputs listed pattern images using the dictionary generating means.

As has been described above, according to the sixth embodiment, the number of gray levels of the pattern image can be reduced in advance. Therefore, the amount of data to be encoded can be reduced in advance.

Next, a seventh embodiment of the invention is described.

In the seventh embodiment, the number-of-gray-levels reducing means that is used in the fifth embodiment is added to means other than the pattern image cut-out means 11, dictionary generating means 13 and encoded data generating means 15 of the image encoding apparatus 1 shown in FIG. 1. For example, pattern image synthesis means with number-of-gray-levels reducing means is provided.

As has been described above, according to the seventh embodiment, the number of gray levels of the pattern image can be reduced in advance. Therefore, the amount of data to be encoded can be reduced in advance.

Next, an eighth embodiment of the invention is described.

Figure 12:
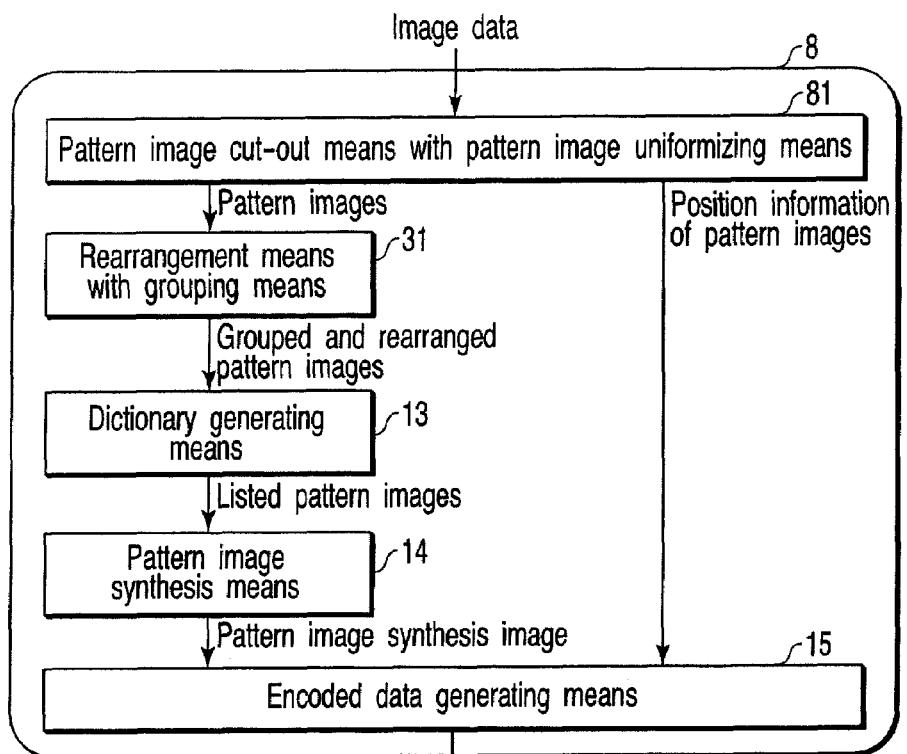
FIG. 12 is a block diagram that schematically shows the structure of an image encoding apparatus according to an eighth embodiment of the present invention.

FIG. 12 schematically shows the structure of an image encoding apparatus 8 according to the eighth embodiment. The image encoding apparatus 8 according to the eighth embodiment includes pattern image cut-out means 81 with pattern image uniformizing means, which is obtained by modifying the pattern image cut-out means 11 of the image encoding apparatus 3 shown in FIG. 7. The other structural parts are common to those of the image encoding apparatus 3, so the common parts are denoted by like reference numerals and a description is omitted.

The pattern image uniformizing means in the pattern image cut-out means 81 with pattern image uniformizing means compares pattern images that are to be cut out (or have been cut out), enlarges/reduces the pattern images, and represents similar pattern images by a single pattern image. In short, the pattern image uniformizing means executes a process of reducing the number of pattern images. In this case, reduction-scale information (enlargement/reduction information) of the pattern images is indispensable.

At last, the pattern image cut-out means 81 with pattern image uniformizing means generates pattern images and their position information, using the pattern image cut-out means.

Specifically, the pattern image cut-out means 81 with pattern image uniformizing means compares pattern images that are to be cut out (or have been cut out) of input image data, enlarges/reduces the pattern images, and represents similar pattern images by a single pattern image. Thereby, the number of pattern images is reduced, and finally remaining pattern images and their position information are output.

As has been described above, according to the eighth embodiment, the amount of encoding of the pattern images, which are encoded by the encoded data generating means, can be reduced.

Next, a ninth embodiment of the invention is described.

Figure 13:
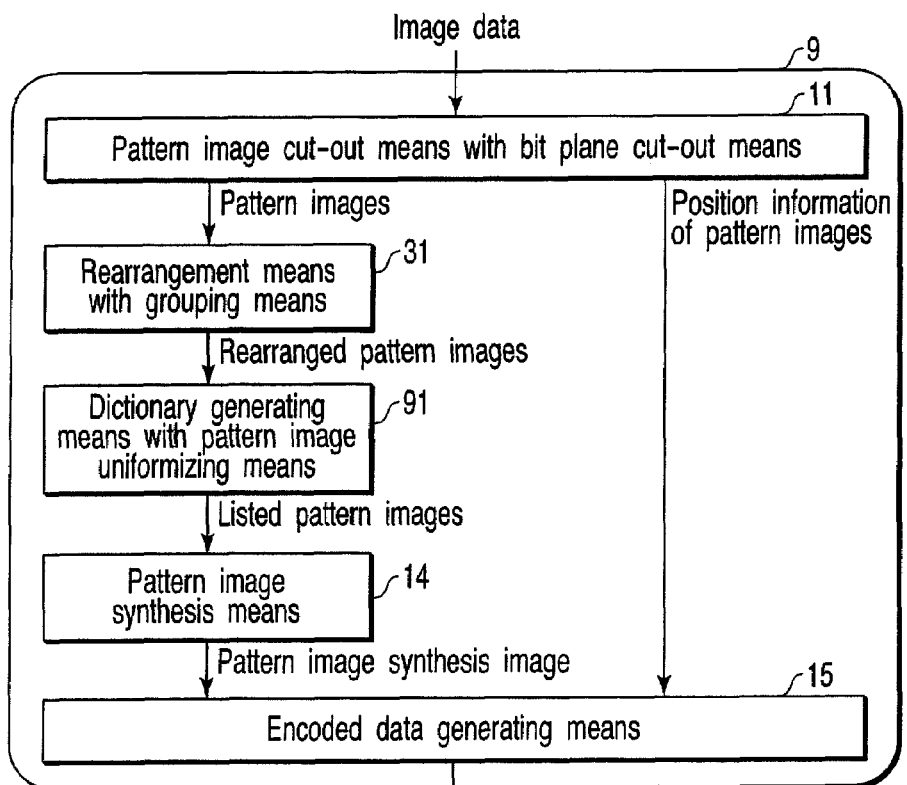
FIG. 13 is a block diagram that schematically shows the structure of an image encoding apparatus according to a ninth embodiment of the present invention.

FIG. 13 schematically shows the structure of an image encoding apparatus 9 according to the ninth embodiment. The image encoding apparatus 9 according to the ninth embodiment includes dictionary generating means 91 with pattern image uniformizing means, which is obtained by modifying the dictionary generating means 13 of the image encoding apparatus 3 shown in FIG. 7. The other structural parts are common to those of the image encoding apparatus 3, so the common parts are denoted by like reference numerals and a description is omitted.

The dictionary generating means 91 with pattern image uniformizing means receives pattern images that have been rearranged by the rearrangement means 31 with grouping means.

The dictionary generating means 91 with pattern image uniformizing means compares input pattern images, enlarges/reduces the pattern images, and represents similar pattern images by a single pattern image. Thereby, the number of pattern images is reduced, the remaining pattern images are listed, and the listed pattern images are output.

As has been described above, according to the ninth embodiment, the amount of encoding of pattern images, which are encoded by the encoded data generating means, can be reduced.

Next, a tenth embodiment of the invention is described.

In the tenth embodiment, the pattern image uniformizing means that is used in the eighth embodiment is added to means other than the pattern image cut-out means 11, dictionary generating means 13 and encoded data generating means 15 of the image encoding apparatus 1 shown in FIG. 1. For example, pattern image synthesis means with pattern image uniformizing means is provided.

As has been described above, according to the tenth embodiment, the amount of encoding of pattern images, which are encoded by the encoded data generating means, can be reduced.

The respective means in each of the above-described embodiments of the present invention may be configured by software or by hardware.

As has been described above, according to the embodiments of the invention, the pattern images are gathered and encoded, and thus the encoding efficiency is improved. By intentionally finding an arrangement pattern with high encoding efficiency, the compression efficiency is stabilized and the encoding efficiency is enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image encoding apparatus which encodes image data, comprising:
    a region image cut-out unit which cuts out a plurality of region images from the image data, and outputs the plurality of cut-out region images and position information associated with the cut-out region images;
    a rearrangement unit which rearranges the plurality of region images which are cut out by the region images cut-out unit;
    a position information updating unit which updates the position information of the plurality of region images which are rearranged by the rearrangement unit;
    a region image synthesis unit which generates a synthesis image by synthesizing the plurality of region images which are rearranged by the rearrangement unit; and
    an encode generating unit which encodes the synthesis image and the position information which is updated by the position information updating unit.

2. The image encoding apparatus according to claim 1, further comprising a dictionary generating unit which lists the plurality of region images which are rearranged by the rearrangement unit.

3. The image encoding apparatus according to claim 2, wherein the dictionary generating unit comprises a number-of-gray-levels reducing unit which reduces a number of gray levels of the region images.

4. The image encoding apparatus according to claim 2, wherein the dictionary generating unit comprises a region image uniformizing unit which treats similar region images of the plurality of region images, which have different magnifications, as the same region image, and represents the similar region images by a single region image, and the dictionary generating unit generates dictionary information in which the region images are put together.

5. The image encoding apparatus according to claim 1, wherein the rearrangement unit comprises a grouping unit which selects and groups a plurality of arbitrary region images.

6. The image encoding apparatus according to claim 1, wherein the region image cut-out unit comprises a bit plane cut-out unit and cuts out region images associated with bit planes.

7. The image encoding apparatus according to claim 1, wherein the region image cut-out unit comprises a number-of-gray-levels reducing unit which reduces a number of gray levels of the region images.

8. The image encoding apparatus according to claim 1, wherein any one of the units, other than the region image cut-out unit and the encode generating unit, comprises a number-of-gray-levels reducing unit.

9. The image encoding apparatus according to claim 1, wherein the region image cut-out unit comprises a region image uniformizing unit which treats similar region images of the plurality of region images, which have different magnifications, as the same region image, and represents the similar region images by a single region image.

10. The image encoding apparatus according to claim 1, wherein any one of the units, other than the region image cut-out unit and the encode generating unit, comprises a region image uniformizing unit which treats similar region images of the plurality of region images, which have different magnifications, as the same region image, and represents the similar region images by a single region image.

11. An image encoding apparatus which encodes image data, comprising:
    means for cutting out a plurality of region images from the image data, and outputs the plurality of cut-out region images and position information associated with the cut-out region images;
    means for rearranging the plurality of cut-out region images;
    means for updating the position information of the plurality of rearranged region images;
    means for generating synthesis image by synthesizing the plurality of rearranged region images; and
    means for encoding the synthesis image and the updated position information.

12. The image encoding apparatus according to claim 11, further comprising means for listing the plurality of rearranged region images.

13. The image encoding apparatus according to claim 12, wherein the means for listing comprises means for reducing a number of gray levels of the region images.

14. The image encoding apparatus according to claim 12, wherein the means for listing comprises means for treating similar region images of the plurality of region images, which have different magnifications, as the same region image, and representing the similar region images by a single region image, and the means for listing generates dictionary information in which the region images are put together.

15. The image encoding apparatus according to claim 11, wherein the means for rearranging comprises means for selecting and grouping a plurality of arbitrary region images.

16. The image encoding apparatus according to claim 11, wherein the means for cutting out cuts out region images associated with bit planes.

17. The image encoding apparatus according to claim 11, wherein the means for cutting out comprises means for reducing a number of gray levels of the region images.

18. The image encoding apparatus according to claim 11, wherein the means for cutting out comprises means for treating similar region images of the plurality of region images, which have different magnifications, as the same region image, and representing the similar region images by a single region image.

19. An image encoding method which encodes image data for execution by an image encoding apparatus, comprising:
    cutting out, by the image encoding apparatus, a plurality of region images from the image data, and outputting the plurality of cut-out region images and position information associated with the cut-out region images;
    rearranging, by the image encoding apparatus, the plurality of region images which are cut out;
    updating, by the image encoding apparatus, the position information of the plurality of region images which are rearranged;
    generating, by the image encoding apparatus, synthesis image by synthesizing the plurality of region images which are rearranged; and
    encoding, by the image encoding apparatus, the synthesis image and the position information which is updated.

20. The image encoding method according to claim 19, further comprising: listing the plurality of region images which are rearranged.

* * * * *